(12) United States Patent
Huang et al.

(10) Patent No.: US 11,394,652 B2
(45) Date of Patent: Jul. 19, 2022

(54) MULTI-PACKET RECOGNITION METHOD, DATA PACKET RECOGNITION METHOD, AND TRAFFIC REDIRECTION METHOD

(71) Applicant: WANGSU SCIENCE & TECHNOLOGY CO., LTD., Shanghai (CN)

(72) Inventors: Zhihui Huang, Shanghai (CN); Xiaopeng Liu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 661 days.

(21) Appl. No.: 16/342,662

(22) PCT Filed: Feb. 27, 2018

(86) PCT No.: PCT/CN2018/077431
§ 371 (c)(1),
(2) Date: Apr. 17, 2019

(87) PCT Pub. No.: WO2019/134240
PCT Pub. Date: Jul. 11, 2019

(65) Prior Publication Data
US 2021/0359950 A1     Nov. 18, 2021

(30) Foreign Application Priority Data
Jan. 5, 2018 (CN) .......................... 201810010714.9

(51) Int. Cl.
*H04L 47/2475* (2022.01)
*H04L 45/30* (2022.01)
(Continued)

(52) U.S. Cl.
CPC ........ *H04L 47/2475* (2013.01); *H04L 45/306* (2013.01); *H04L 47/2483* (2013.01); *H04L 67/1014* (2013.01)

(58) Field of Classification Search
CPC ............... H04L 47/2475; H04L 45/306; H04L 47/2483; H04L 67/1014
See application file for complete search history.

(56) References Cited

U.S. PATENT DOCUMENTS

2010/0095367 A1   4/2010   Narayanaswamy
2013/0041934 A1*   2/2013   Annamalaisami .......................... H04L 47/2483
                                                              709/203

(Continued)

FOREIGN PATENT DOCUMENTS

CN     101605123 A     12/2009
CN     101741644 A     6/2010
(Continued)

OTHER PUBLICATIONS

The China National Intelleectual Property Administration (CNIPA) The China Search Report for 201810010714.9 dated Mar. 18, 2019 18 Pages.

(Continued)

*Primary Examiner* — Nicholas R Taylor
*Assistant Examiner* — Sanjoy K Roy

(57) ABSTRACT

Multi-packet recognition method, data packet recognition method, and traffic redirection method are provided. The multi-packet recognition method includes: obtaining a first data packet transmitted from a client terminal after a connection between the client terminal and a destination server is established; determining whether a format feature in the first application layer data of the first data packet matches a data packet format feature of any known application program, and when a matched application program is found, (Continued)

obtaining a second data packet; and when the format feature in the application layer data of the second data packet matches the matched application program and the second data packet satisfies a pre-configured condition, recognizing the matched application program as the application program sending the first data packet.

17 Claims, 6 Drawing Sheets

(51) Int. Cl.
*H04L 47/2483* (2022.01)
*H04L 67/1014* (2022.01)
*H04L 45/302* (2022.01)

(56) References Cited

U.S. PATENT DOCUMENTS

2014/0149580 A1* 5/2014 Albert ............... H04L 43/04
709/224
2014/0173094 A1* 6/2014 Majumdar ............ H04L 43/028
709/224
2015/0215285 A1* 7/2015 Fleury ................... H04L 67/10
726/13
2016/0021077 A1* 1/2016 Larson ................ H04L 29/1232
713/154

FOREIGN PATENT DOCUMENTS

| CN | 101854342 A | 10/2010 |
| CN | 102006242 A | 4/2011 |
| CN | 103491025 A | 1/2014 |
| CN | 103873320 A | 6/2014 |

OTHER PUBLICATIONS

The European Patent Office (EPO) The Extended European Search Report for 18898163.3 dated Feb. 14, 2020 15 Pages.
The World Intellectual Property Organization (WIPO) International Search Report and Written Opinion for PCT/CN2018/077431 dated Oct. 11, 2018 9 Pages.

* cited by examiner

MULTI-PACKET RECOGNITION METHOD, DATA PACKET RECOGNITION METHOD, AND TRAFFIC REDIRECTION METHOD

CROSS-REFERENCE TO RELATED APPLICATIONS

This application is a national phase entry under 35 U.S.C § 371 of International Application No. PCT/CN2018/077431 filed on Feb. 27, 2018, which claims priority of Chinese Patent Application No. 201810010714.9, filed with the State Intellectual Property Office of P. R. China on Jan. 5, 2018, the entire contents of all of which are incorporated herein by reference.

FIELD OF THE DISCLOSURE

The present disclosure relates to the field of Internet technologies and, more particularly, relates to a multi-packet recognition method, a data packet recognition method, and a traffic redirection method.

BACKGROUND

In general, different application programs have different requirements for the quality of network links. For example, a video application program often requires a lower link quality than a gaming application program. In practical applications, each network link carries a limited amount of traffic. Thus, when the video application program and the gaming application program are sharing a same high-quality network link, it is likely that the overloaded link degrades user's experience of accessing Internet. Similarly, when an application program requiring a high-quality link is assigned to a poor-quality link for purpose of load balancing, the user's experience of accessing Internet may also be degraded. Thus, it is important to properly assign and redirect traffic of different application programs.

The inventors of the present invention discovered that the existing technology redirects traffic based on server IP addresses. Such traffic assignments are pertaining to different servers, rather than different application programs. Thus, it is unable to assign links to satisfy different requirements of different application programs.

BRIEF SUMMARY OF THE DISCLOSURE

The objective of the embodiments of the present disclosure is to provide a multi-packet recognition method, a data packet recognition method, and a traffic redirection method to recognize an application program associated with (e.g., sending) a traffic data packet and assign a routing path based on a pre-configured routing policy corresponding to the recognized application program. Thus, network traffic redirection is optimized, and service quality of back-end link and user's experience of accessing Internet are improved.

To solve the problems in the existing technology, embodiments of the present disclosure provide a multi-packet recognition method, comprising: obtaining a first data packet transmitted from a client terminal after a connection between the client terminal and a destination server is established, where the first data packet is a first data packet to carry application layer data; determining whether a format feature in the application layer data of the first data packet matches a data packet format feature of any known application program, and when a matched application program is found, obtaining a second data packet, where the second data packet is a second data packet that is transmitted through the connection and carries the application layer data; and when the format feature in the application layer data of the second data packet matches the matched application program and the second data packet satisfies a pre-configured condition, recognizing the matched application program as the application program associated with the first data packet.

Embodiments of the present disclosure also provide a traffic redirection method, comprising: determining an application program associated with a traffic data packet based on the aforementioned multi-packet recognition method; obtaining a pre-configured routing policy corresponding to the application program; and based on the routing policy, forwarding the traffic data packet.

Embodiments of the present disclosure also provide a data packet recognition method, comprising: obtaining a first data packet transmitted from a client terminal after a connection between the client terminal and a destination server is established, wherein the first data packet is a first data packet to carry application layer data; based on an IP address and a port number of the destination server carried in the first data packet, determining whether index information matching the first data packet is present in a pre-configured database, wherein the index information includes an IP address and a port number of a server, and the database stores mapping relationships between the index information and the application programs; when it is determined that the matched index information is present, recognizing the application program corresponding to the index information as the application program associated with (e.g., sending) the first data packet; when it is determined that no matched index information is present, determining an application program matching a format feature of the first data packet; when the matched application program is found, and the application programs corresponding to the IP address of the destination server include the matched application program, recognizing the matched application program as the application program associated with the first data packet; when the matched application program is found, but the IP address of the destination server is absent in the pre-configured database or the application programs corresponding to the IP address of the destination server do not include the matched application program, obtaining a second data packet, wherein the second data packet is a second data packet that is transmitted through the connection and carries application layer data; and when the format feature of the second data packet matches the matched application program and the second data packet satisfies a pre-configured condition, recognizing the matched application program as the application program associated with the first data packet.

Embodiments of the present disclosure also provides a traffic redirection method, comprising: determining an application program associated with a traffic data packet based on the aforementioned data packet recognition method; obtaining a pre-configured routing policy corresponding to the application program; and based on the routing policy, forwarding the traffic data packet.

With respect to the existing technology, embodiments of the present disclosure first detect a format feature in application layer data of a first data packet, determine an application program matching the first data packet, and when the matched application program is found, detect a second data packet. When the second data packet also matches the matched application program and satisfies a pre-configured condition, the matched application program is recognized as the application program associated with the first data packet.

The method of recognizing the application program associated with the data packet is beneficial in improving the accuracy of recognizing the application program. In addition, after the application program associated with the data packet is recognized, the data packet is forwarded based on a pre-configured routing policy corresponding to the associated application program. Thus, network traffic direction is optimized, and service quality of back-end link and user's experience of accessing Internet are improved.

Further, determining whether the second data packet satisfies the pre-configured condition includes: determining whether specific bytes in the application layer data of the second data packet are the same as the corresponding bytes in the application layer data of the first data packet, and a transmission direction of the second data packet matches a data transmission direction of the matched application program. A method of determining whether the second data packet belongs to the same application program as the first data packet is provided.

Further, the first data packet carries an IP address and a port number of the destination server. Before determining an application program matching the format feature of the first data packet, the multi-packet recognition method further includes: based on the IP address and the port number of the destination server carried in the first data packet, determining whether index information matching first data packet is present in a pre-configured database, where the index information includes an IP address and a port number of a server, and the database stores mapping relationships between the index information and the application programs; when it is determined that a matched index information is present, recognizing the application program corresponding to the index information as the application program associated with the first data packet; and when it is determined that no matched index information is present, executing a step of determining an application program matching the format feature of the first data packet. Storing mapping relationships between the index information and the application programs is beneficial in increasing the speed of recognizing the data packet.

Further, the first data packet also carries a protocol type of the connection between the client terminal and the destination server. The index information also includes a protocol type of the connection between the client terminal and the destination server. Determining whether the index information matching the first data packet is present in the pre-configured database includes: based on the IP address and the port number of the destination server carried in the data packet and the protocol type carried in the first data packet, determining whether the index information matching the first data packet is present in the pre-configured database. Thus, it is beneficial in increasing the accuracy of matching.

Further, after the matched application program is found, but the IP address of the destination server is absent in the pre-configured database or the application programs corresponding to the IP address of the destination server do not include the matched application program, and before obtaining a second data packet, the method further includes: selecting a pre-configured routing path to forward the first data packet, where the pre-configured routing path has less desired transmission quality than the routing path corresponding to the application program matched by the routing policy. Selecting the less desired routing path to forward the first data packet not only avoids occupation and overloading of the routing path selected based on the routing policy due to false recognition, but also avoids accumulation of data packets.

BRIEF DESCRIPTION OF THE DRAWINGS

One or more embodiments are provided for exemplary descriptions with reference to the accompanying drawings. The exemplary descriptions are not intended to limit the scope of the embodiments. Elements having same reference numerals in the drawings refer to same or similar elements. Unless specifically stated otherwise, the drawings do not constitute limitation on proportions.

DETAILED DESCRIPTION

To make the objectives, technical solutions, and advantages of the present disclosure clearer, the following further describes the embodiments of the present disclosure in details with reference to the accompanying drawings. It should be understood that the specific embodiments described herein are only used to explain the present disclosure and are not used to limit the present disclosure. Without departing from the spirit and principles of the present disclosure, any modifications, equivalent substitutions, and improvements, etc. shall fall within the scope of the present disclosure.

Figure 1:
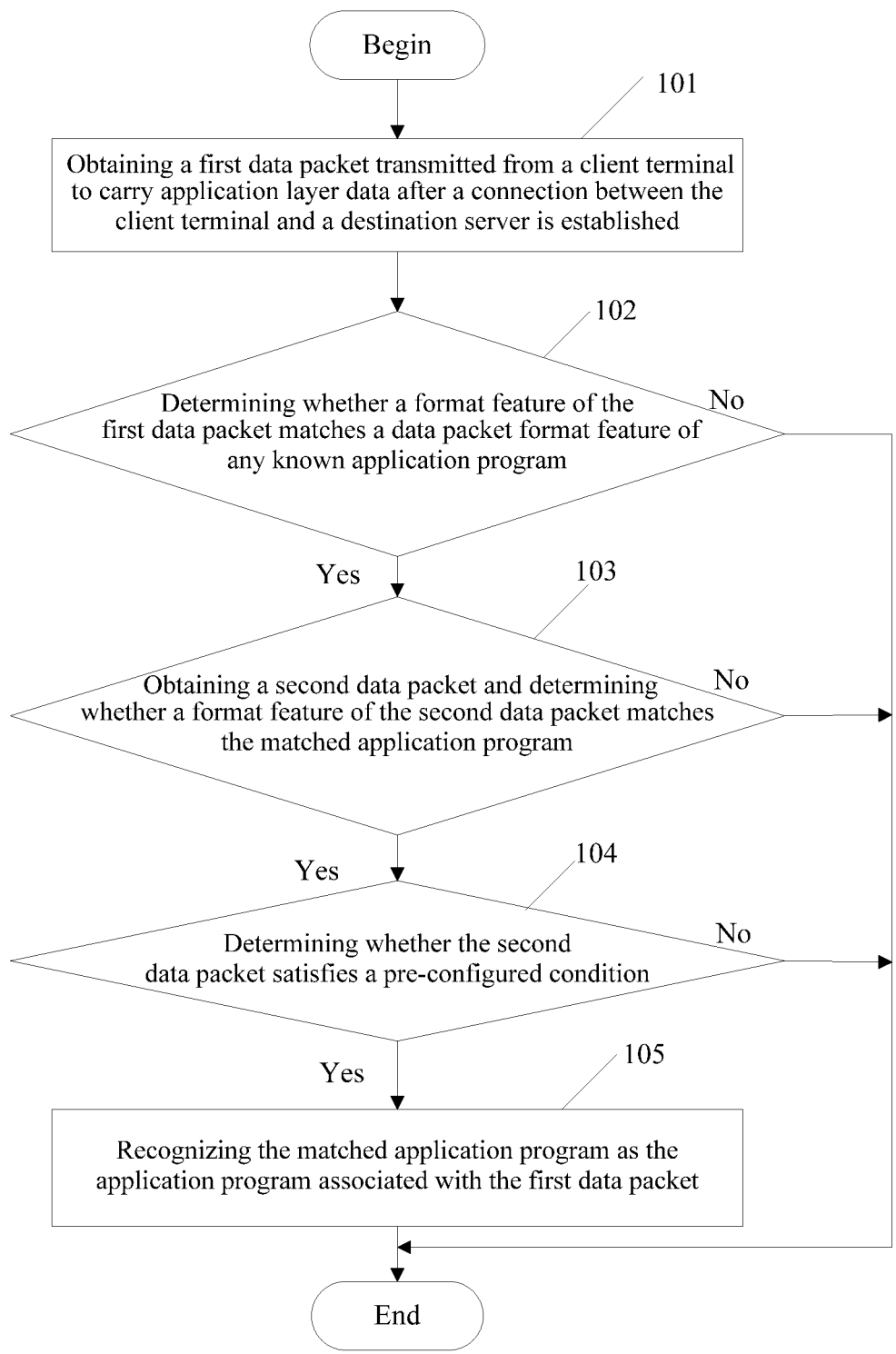
FIG. 1 illustrates a flow chart of an exemplary multi-packet recognition method according to disclosed embodiments.

The present disclosure provides a multi-packet recognition method, and specific processes are illustrated in FIG. 1.

Step 101: obtaining a first data packet transmitted from a client terminal to carry application layer data after a connection between the client terminal and a destination server is established.

In one embodiment, the connection established between the client terminal and the destination server may be a transmission control protocol (TCP) connection, a user datagram protocol (UDP) connection, or a connection based on other transmission protocol, which is not limited by the present disclosure. After the connection between the client terminal and the destination server is established, the client terminal may exchange data with the destination server through the connection.

In one embodiment, the method may be implemented based on a proxy program. The proxy program may run on ingress devices or on a central server. The proxy program obtains, from the ingress devices, data packets sent by the client terminal and the destination server through the connection.

Step 102: determining whether a format feature of the first data packet matches a data packet format feature of any known application program.

In this step, information parsed from specific bytes in the application layer data of the first data packet may be compared with relevant feature in application layer data of any known application program to determine whether a format feature of the first data packet matches a data packet format feature of any known application program. When the information parsed from the specific bytes in the application layer data of the first data packet is the same as the relevant feature in the application data of a known application program, it is determined that the format feature of the first data packet matches a data packet format feature of a known application program. The known application program is the application program matching the format feature in the application layer data of the first data packet.

In one embodiment, the connection between the client terminal and the destination server is a TCP connection. The format feature of the application layer data in the data packet sent by an application program A includes that the first and second bytes represent a length for a data parsing unit. Because the communication is interactive, when no response is received from the destination server, the client terminal may not send other request again. Thus, multiple data parsing units may not be concatenated. The recorded length is equal to the actual length of the application layer data. The third and fourth bytes represent a fixed value for a version number (e.g., 0xaa, 0xff). The fifth through eighth bytes represent an IP address of the server, which is the same as the destination address of packets sent by the client terminal to the destination server or the source address of packets sent by the destination server to the client terminal. The ninth and tenth bytes represent a command field. For the first data packet to carry the application layer data, the value of the command field is "0x00a1", corresponding to "login verification response".

Based on the aforementioned format features of the specific bytes, it is determined that the first and second bytes in the application layer data of the first data packet may be a length of a data parsing unit, which is the same as the length recorded in the first and second bytes in the application data of the application program A. The third and fourth bytes may be a fixed value for a version number, which is the same as a fixed value for a version number recorded in the third and fourth bytes in the application data of the application program A. The fifth through eighth bytes may be a server IP address, which is the same as the server IP address recorded in the fifth through eighth bytes in the application data of the application program A. The ninth and tenth bytes may be a command field. When the command field is "0x00a1", it is determined that the information parsed from the specific bytes in the application layer data of the first data packet is the same as the relevant features in the application data of the application program A. Thus, the format feature of the data packet matches the data packet format feature of the application program A. The application program A is the application program matching the application layer data format feature of the first data packet.

It should be noted that different application programs may have different format features of the specific bytes. The format features of the specific bytes for the known application programs are locally stored in advance for subsequent matching.

When it is determined that a format feature of the first data packet matches a data packet format feature of a known application program, step 103 is executed. When it is determined that a format feature of the first data packet does not match any data packet format feature of any known application program, the process is terminated. That is, the process of recognizing data packets is terminated.

Step 103: obtaining a second data packet and determining whether a format feature of the second data packet matches the matched application program.

When it is determined that the format feature of the first data packet matches a format feature of the data packet of a known application program, it is still not definitively determined that the matched application program is the application program associated with the first data packet. At this point, the connection between the client terminal and the destination server continues to be monitored to obtain a second data packet. The second data packet is a second data packet to carry the application layer data transmitted through the connection between the client terminal and the destination server. It is worth mentioning that when the connection between the client terminal and the destination server is monitored and no other data packets may be found, i.e., no subsequent data packets, the process of recognizing the data packets may be terminated.

When the second data packet is obtained, the format feature of the second data packet is detected to determine whether the format feature of the second data packet matches the matched application program (i.e., the application program matching the format feature of the first data packet determined in step 102). When information parsed from specific bytes in the application layer data of the second data packet is the same as the relevant features in the application data of the matched application program, it is determined that the format feature of the second data packet also matches the format feature in the data packet of the matched application program. At this point, step 104 is executed. Otherwise, the recognition process is terminated.

Step 104: determining whether the second data packet satisfies a pre-configured condition.

The pre-configured condition includes whether specific bytes in the application layer data of the second data packet match corresponding bytes in the application layer data of the first data packet and whether the transmission direction of the second data packet matches a data transmission direction of the matched application program.

In practical applications, after the connection between the corresponding client terminal and the destination server is established, some application programs may transmit two consecutive data packets to carry the application layer data to the destination server. For the application programs, the transmission direction of the second data packet is from the client terminal to the destination server. Some other application programs may transmit only one data packet to carry the application layer data. After a response from the destination server is received, the other application programs may transmit another data packet. For such application programs, the transmission direction of the second data packet is from the destination server to the client terminal. Thus, whether the transmission direction of the second data packet matches the data transmission direction of the matched application program is determined in this step.

In addition, when the second data packet corresponding to the matched application program is transmitted from the destination server to the client terminal, the command field in the application layer data of the first data packet may be "0x00a1" and the command field in the application layer data of the second data packet may be "0x01a1", which indicates that the command fields of the two data packets match. In other words, under the circumstance, whether the specific bytes in the application layer data of the second data packet match the corresponding bytes in the application layer data of the first data packet needs to be further determined.

When the specific bytes in the application layer data of the second data packet match the corresponding bytes in the application layer data of the first data packet and the transmission direction of the second data packet matches the data transmission direction of the matched application program, it is determined that the second data packet satisfies the pre-configured condition. At this point, step 105 is executed. Otherwise, the recognition process is terminated.

Step 105: recognizing the matched application program as the application program associated with the first data packet.

In this step, it is determined that the application program associated with the first data packet is the application program matching the format feature of the first data packet determined in step 102.

With respect to the existing technology, the embodiment of the present disclosure provides a method of recognizing an application program associated with traffic data based on multiple data packets. The embodiment first detects a format feature in application layer data of a first data packet, searches for an application program that matches the first data packet, and detects a format feature in the application layer data of a second data packet after a matched application program is found. When the second data packet also matches the matched application program and a pre-configured condition is satisfied, the matched application program is recognized as the application program associated with the first data packet. The method of recognizing the application program associated with the data packet is likely to improve the accuracy of recognizing the application program.

Figure 2:
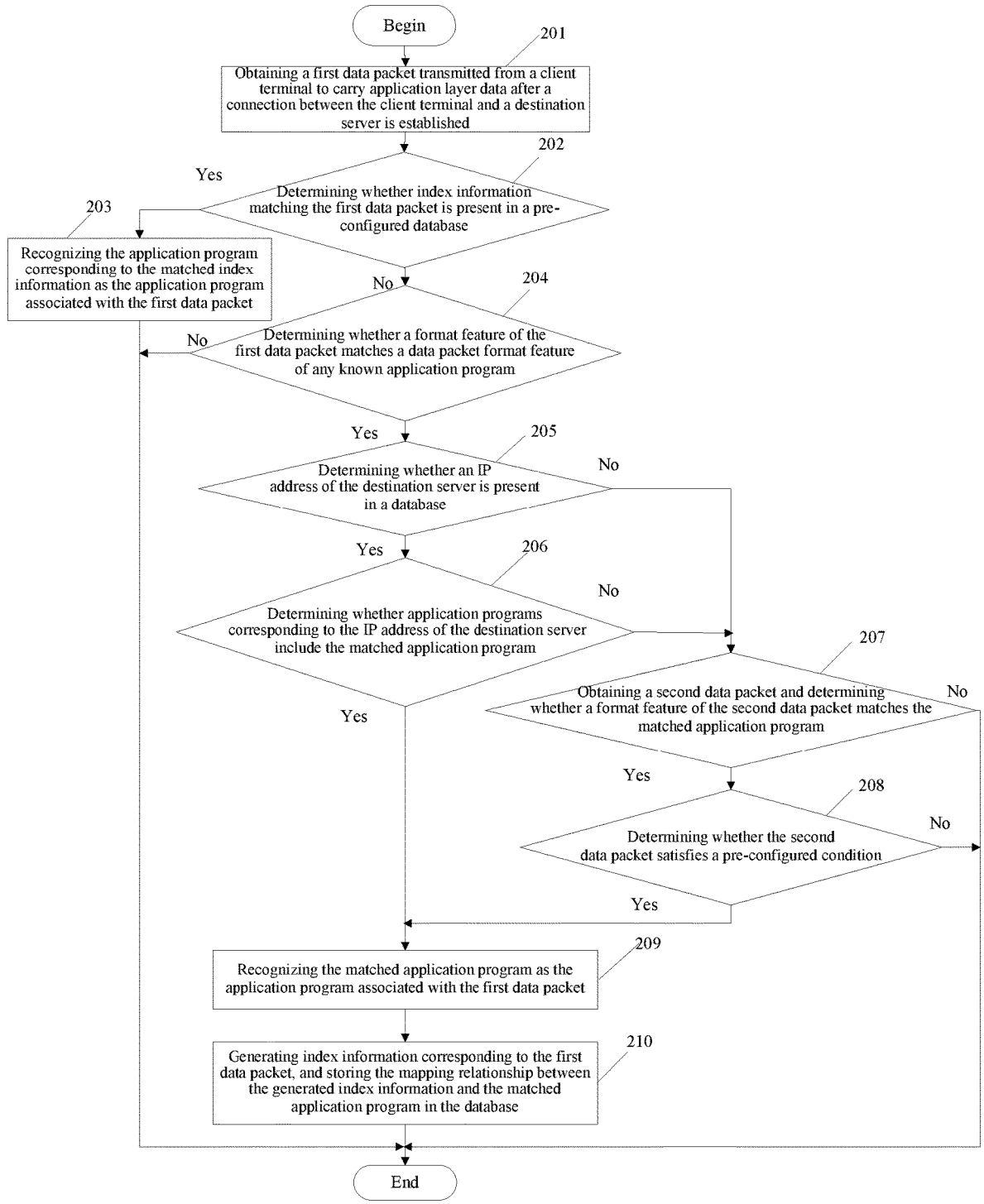
FIG. 2 illustrates a flow chart of another exemplary multi-packet recognition method according to disclosed embodiments.

Another embodiment of the present disclosure provides another multi-packet recognition method, which is an improvement further to the previously described embodiment. The main improvement includes that after a matched application program is determined based on the format feature of the first data packet, it is further determined whether an IP address of the destination server is present in a pre-configured database and whether application programs corresponding to the IP address of the destination server include the matched application program. The flow chart of an exemplary embodiment is illustrated in FIG. 2.

Step 201: obtaining a first data packet transmitted from a client terminal to carry application layer data after a connection between the client terminal and a destination server is established.

Step 202: based on an IP address and a port number of the destination server carried in the first data packet, determining whether index information matching the first data packet is present in a pre-configured database.

In one embodiment, a database is pre-configured. The database stores mapping relationship between index information and application programs. The mapping relationship is collected based on history data. The index information includes an IP address and a port number of a server.

In this step, the IP address and the port number of the destination server carried in the data packet is extracted first. It is determined whether the index information corresponding to the IP address and the port number of the destination server is present in the database. When it is determined that the index information is present, the corresponding index information is the index information associated with the first data packet, and step 203 is executed. When it is determined that the index information is absent, the index information associated with the first data packet is absent in the database, and step 204 is executed.

Step 203: recognizing the application program corresponding to the matched index information as the application program associated with the first data packet.

As described above, because the database stores the mapping relationships between the index information and the application programs, when it is determined that the index information matching the first data packet is present in the database, it is determined that the application program corresponding to the matched index information is the application program associated with the first data packet.

Step 204: determining whether a format feature of the first data packet matches a data packet format feature of any known application program. When it is determined that the format feature of the data packet matches a data packet format feature of a known application program, step 205 is executed. When it is determined that the format feature of the data packet does not match any data packet format feature of any known application program, the recognition process is terminated.

Step 205: determining whether an IP address of the destination server is present in a database. When the IP address of the destination server is present, step 206 is executed. When the IP address of the destination server is absent, step 207 is executed directly.

Step 206: determining whether application programs corresponding to the IP address of the destination server include the matched application program.

After it is determined that the IP address of the destination server is present in the database, application programs corresponding to the IP address of the destination server are searched in the database, and it is determined whether the corresponding application programs include the matched application program determined in step 204. When the corresponding application programs include the matched application program, step 209 is executed directly. Otherwise, step 207 is executed.

Step 207: obtaining a second data packet and determining whether a format feature of the second data packet matches the matched application program.

In this step, the connection between the client terminal and the destination server continues to be monitored to obtain the second data packet. After the second data packet is obtained, the format feature of the second data packet is detected to determine whether the format feature of the second data packet matches the matched application program (i.e., the application program matching the format feature of the first data packet determined in step 204).

When information parsed from specific bytes in the application layer data of the second data packet is the same as the relevant features in the application data of the matched application program, it is determined that the format feature of the second data packet also matches the format feature in the data packet of the matched application program. At this point, step 208 is executed. Otherwise, the recognition process is terminated.

Step 208: determining whether the second data packet satisfies a pre-configured condition.

When the specific bytes in the application layer data of the second data packet match the corresponding bytes in the application layer data of the first data packet and a transmission direction of the second data packet matches a data transmission direction of the matched application program, it is determined that the second data packet satisfies the pre-configured condition, and step 209 is executed. Otherwise, the recognition process is terminated.

Step 209: recognizing the matched application program as the application program associated with the first data packet.

Step 210: generating index information corresponding to the first data packet, and storing the mapping relationship between the generated index information and the matched application program in the database.

In this step, the IP address and the port number of the destination server may be used to generate the index information corresponding to the first data packet, and the mapping relationship between the generated index information and the matched application program is stored in the database. Thus, when the connection between the client terminal and the destination server is established next time, the IP address and the port number of the server may be used directly to search the corresponding application program in the database, thereby improving the recognition efficiency.

It should be noted that, in this embodiment, a timeout timer is configured for each record in the database (a record is a mapping relationship between a set of index information and an application program). When the timeout timer expires, the record is deleted from the database (i.e., the mapping relationship between the set of the index information and the application program is deleted). This is because an application program corresponding to a port number of a server is subject to change. For example, the application program A may be replaced by the application program B. In the embodiment, after the mapping relationship between the index information and the application program is stored in the database, the mapping relationship between the port number of the current server and the application program is fixed. However, in practical applications, the application program corresponding to the port number of the current server is subject to change. For example, the application program A may be replaced by the application program B. Thus, each record in the database is configured with a timeout timer. When the timeout timer expires, the corresponding record is deleted. False recognition of the application program B as the application program A may be avoided.

In addition, it is worth mentioning that the present embodiment is illustrated by the index information including the IP address and the port number of the server. However, in practical applications, the index information may further include a protocol type (e.g., TCP or UDP) for a connection between the client terminal and the server, which is likely to improve the accuracy of recognizing the application program. At this point, in step 202, the IP address of the destination server, the port number of the destination server, and the protocol type between the client terminal and the destination server carried in the first data packet may be simultaneously extracted. Based on the IP address of the destination server, the port number of the destination server, and the protocol type, whether any index information matching the first data packet is present in the database is determined. In step 210, the IP address of the destination server and the port number of the destination server, and the protocol type are required to generate the index information corresponding to the first data packet.

Further, in this embodiment, after the matched application program is determined based on the first data packet format feature, it is further determined whether the IP address of the destination server is present in the pre-configured database and whether the application programs corresponding to the IP address of the destination server include the matched application program. Thus, the efficiency of recognizing the network traffic is improved, and the rate of false recognition is reduced. At the same time, storing the mapping relationship between the index information and the application program allows to directly search for the application program corresponding to the data packet in the database when the connection between the client terminal and the destination server is established next time, thereby improving the efficiency of recognizing the data packet.

Figure 3:
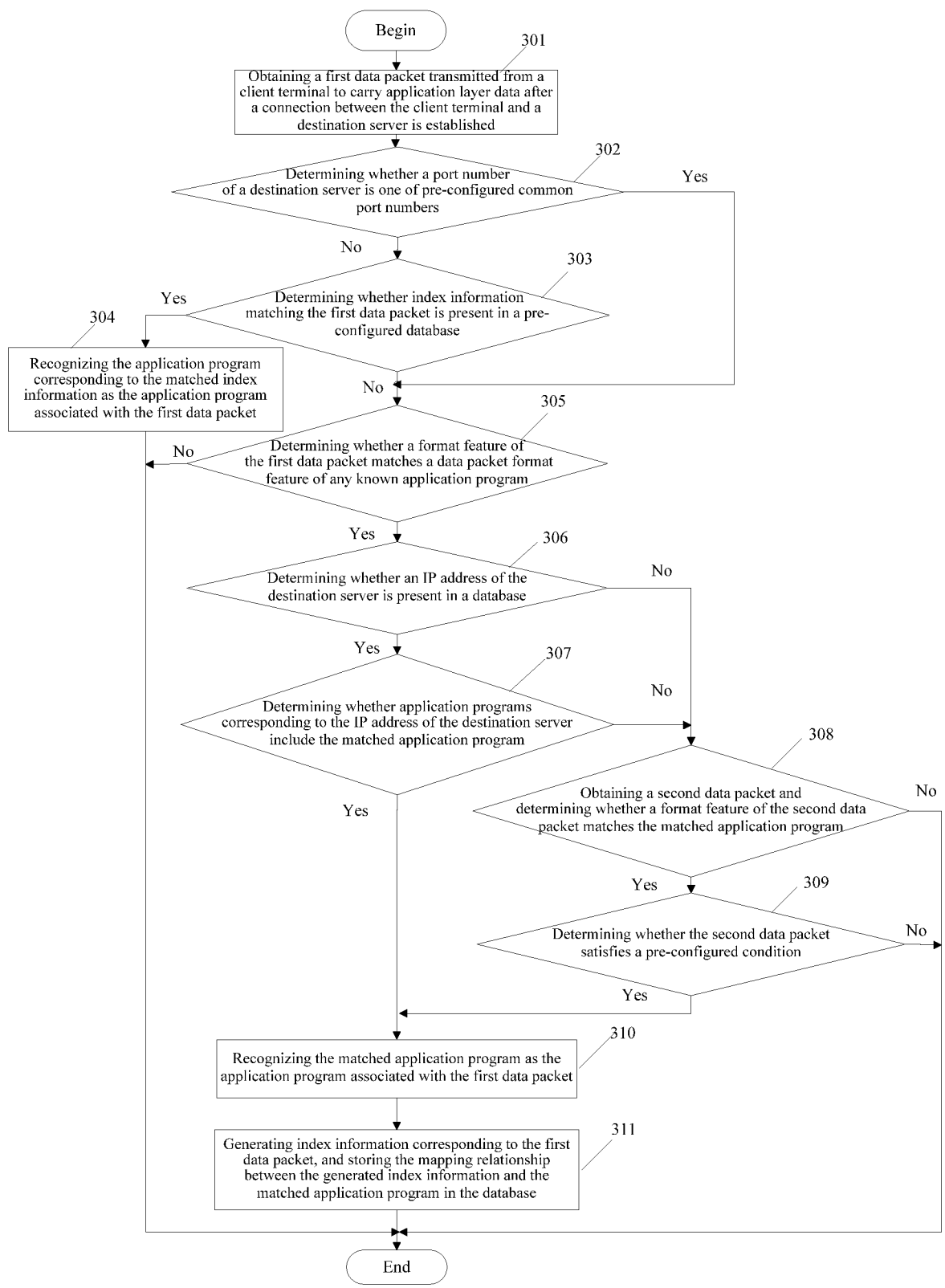
FIG. 3 illustrates a flow chart of another exemplary multi-packet recognition method according to disclosed embodiments.

Another embodiment of the present disclosure provides another multi-packet recognition method, which is an improvement further to the previously described embodiment. The main improvements include that before whether the index information matching the first data packet is present in the database is determined, it is determined whether the port number of the destination server is a pre-configured common port number. The flow chart of an exemplary embodiment is illustrated in FIG. 3.

Step 301: obtaining a first data packet transmitted from a client terminal to carry application layer data after a connection between the client terminal and a destination server is established.

Step 302: determining whether a port number of a destination server is one of pre-configured common port numbers.

In this step, the port number of the destination server carried in the first data packet is extracted first to determine whether the port number of the destination server is one of the pre-configured common port numbers (e.g., in a TCP connection, server port numbers 443, 80, 8080). When it is determined that the port number is not any pre-configured common port number, step 303 is executed. When it is determined that the port number is one of the pre-configured common port numbers, step 305 is executed.

Step 303: based on an IP address and a port number of the destination server carried in the first data packet, determining whether index information matching the first data packet is present in a pre-configured database. When it is determined that the index information is present in the pre-configured database, step 304 is executed. When it is determined that the index information is absent in the pre-configured database, step 305 is executed.

Step 304: recognizing the application program corresponding to the matched index information as the application program associated with the first data packet.

Step 305: determining whether a format feature of the first data packet matches a data packet format feature of any known application program. When it is determined that the first data packet format feature matches a data packet format feature of a known application program, step 306 is executed. When it is determined that the format feature of the first data packet does not match any data packet format feature of any known application program, the recognition process is terminated.

Step 306: determining whether an IP address of the destination server is present in a database. When it is determined that the IP address is present, step 307 is executed. When it is determined that the IP address is absent, step 308 is executed.

Step 307: determining whether application programs corresponding to the IP address of the destination server include the matched application program. When the corresponding application programs include the matched application program, step 310 is executed. Otherwise, step 308 is executed.

Step 308: obtaining a second data packet and determining whether a format feature of the second data packet matches the matched application program.

That is, it is determined whether the format feature of the second data packet matches the matched application program determined in step 305. When the format feature of the second data packet matches the matched application program, step 309 is executed. Otherwise, the recognition process is terminated.

Step 309: determining whether the second data packet satisfies a pre-configured condition.

When the specific bytes in the application layer data of the second data packet match the corresponding bytes in the application layer data of the first data packet and a transmission direction of the second data packet matches a data transmission direction of the matched application program, it is determined that the second data packet satisfies the pre-configured condition, and step 310 is executed. Otherwise, the recognition process is terminated.

Step 310: recognizing the matched application program as the application program associated with the first data packet.

Step 311: generating index information corresponding to the first data packet, and storing the mapping relationship between the generated index information and the matched application program in the database.

With respect to the existing technology, the embodiments of the present disclosure first determine whether the port number is one of the common port numbers, and based on the result of the port number determination, different steps are executed. Thus, false recognition caused by the common port numbers of servers may be avoided.

Figure 4:
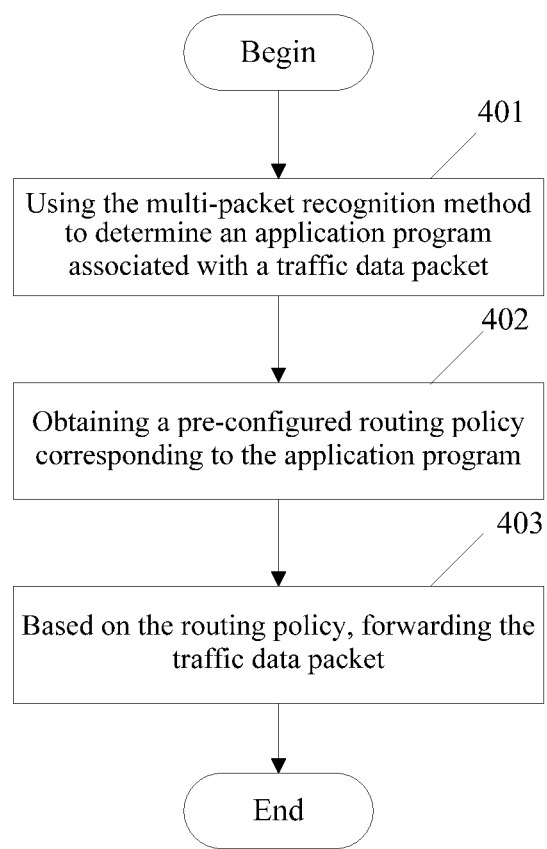
FIG. 4 illustrates a flow chart of an exemplary traffic redirection method according to disclosed embodiments.

Another embodiment of the present disclosure provides a traffic redirection method. The traffic redirection method is based on any of the multi-packet recognition methods previously described. The flow chart of an exemplary traffic redirection method is illustrated in FIG. 4.

Step 401: using the multi-packet recognition method to determine an application program associated with a traffic data packet.

After a connection between a client terminal and a destination server is established, based on the multi-packet recognition method provided by different embodiments of the present disclosure, an application program associated with a first data packet is determined.

Step 402: obtaining a pre-configured routing policy corresponding to the application program.

Because different application programs require different routing path qualities, the embodiment may pre-configure a routing requirement for each type of application programs and assign a routing policy corresponding to the application program. After the application program associated with the first data packet is determined, the routing policy corresponding to the application program is obtained.

Step 403: based on the routing policy, forwarding the traffic data packet.

After the routing policy is obtained, a routing path is assigned for the traffic data packet based on the routing policy, and the data packet is transmitted through the routing path. As previously described, after the routing policy corresponding to the application program associated with the first data packet is obtained, the routing path is assigned based on the routing policy, and the first data packet is transmitted through the routing path. Other data packets transmitted through the connection may be transmitted through the same routing path. That is, the routing path is assigned only once in the embodiment.

With respect to the existing technology, the embodiments of the present disclosure first recognize the application program associated with the traffic data packet. Based on the pre-configured the routing policy corresponding to the associated application program, the data packet is forwarded. Thus, network traffic redirection is optimized, and service quality of back-end link and user's experience of accessing Internet are improved.

Figure 5:
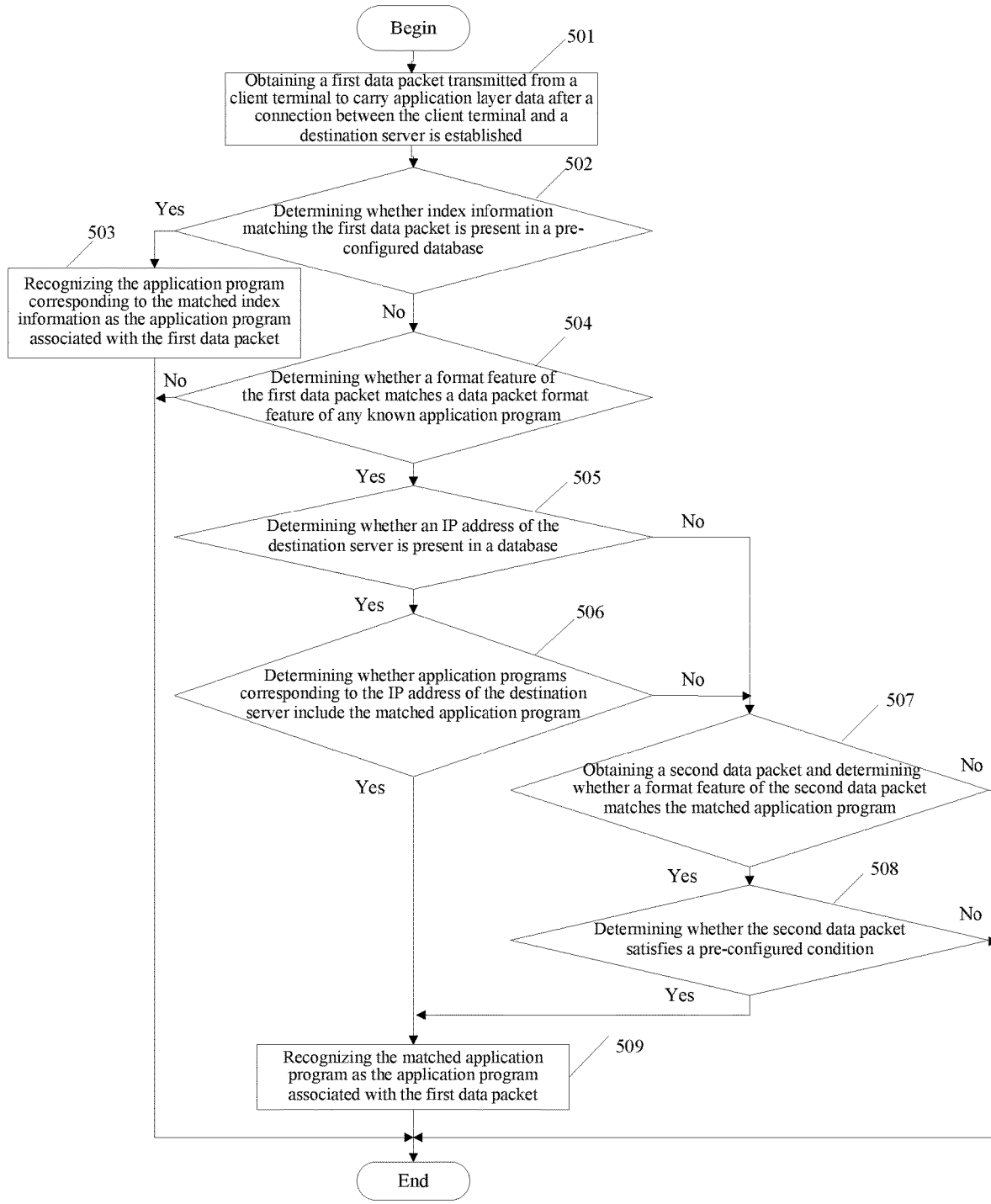
FIG. 5 illustrates a flow chart of an exemplary data packet recognition method according to disclosed embodiments.

Another embodiment of the present disclosure provides a data packet recognition method. The flow chart of an exemplary embodiment is illustrated in FIG. 5.

Step 501: obtaining a first data packet transmitted from a client terminal to carry application layer data after a connection between the client terminal and a destination server is established.

The first data packet is a first data packet transmitted from the client terminal to carry the application layer data after the connection between the client terminal and the destination server is established.

Step 502: based on an IP address and a port number of the destination server carried in the first data packet, determining whether index information matching the first data packet is present in a pre-configured database.

The database stores mapping relationships between the index information and the application programs. The index information includes an IP address of a server and a port number of the server. In this step, the IP address and the port number of the destination server carried in the first data packet is extracted first. It is determined whether the index information corresponding to the IP address and the port number of the destination server is present in the database. When it is determined that the index information is present, the corresponding index information is the index information associated with the first data packet, and step 503 is executed. When it is determined that the index information is absent, the index information associated with the first data packet is absent in the database, and step 504 is executed.

Step 503: recognizing the application program corresponding to the matched index information as the application program associated with the first data packet.

Step 504: determining whether a format feature of the first data packet matches a data packet format feature of any known application program. When it is determined that the format feature of the first data packet matches a data packet format feature of a known application program, step 505 is executed. When it is determined that the format feature of the first data packet does not match any data packet format feature of any known application program, the recognition process is terminated.

Step 505: determining whether an IP address of the destination server is present in a database. When it is determined that the IP address is present, step 506 is executed. When the IP address is absent, step 507 is executed.

Step 506: determining whether the application programs corresponding to the IP address of the destination server include the matched application program. When the corresponding application programs include the matched application program, step 509 is executed. Otherwise, step 507 is executed.

Step 507: obtaining a second data packet and determining whether a format feature of the second data packet matches the matched application program.

After the second data packet is obtained, the format feature of the second data packet is detected to determine whether the format feature of the second data packet matches the matched application program (i.e., the application program matching the format feature of the first data packet determined in step 504).

When information parsed from specific bytes in the application layer data of the second data packet is the same as the relevant features in the application data of the matched application program, it is determined that the format feature of the second data packet also matches the format feature in the data packet of the matched application program. At this point, step 508 is executed. Otherwise, the recognition process is terminated.

Step 508: determining whether the second data packet satisfies a pre-configured condition.

When the specific bytes in the application layer data of the second data packet match the corresponding bytes in the application layer data of the first data packet and a transmission direction of the second data packet matches a data transmission direction of the matched application program, it is determined that the second data packet satisfies the pre-configured condition, and step 509 is executed. Otherwise, the recognition process is terminated.

Step 509: recognizing the matched application program as the application program associated with the first data packet.

It is worth mentioning that the present embodiment is illustrated by the index information including the IP address and the port number of the server. However, in practical applications, the index information may further include a protocol type (e.g., TCP or UDP) for a connection between the client terminal and the server, which is likely to improve the accuracy of recognizing the application program. When the index information includes the IP address, the port number, and the protocol type of the server, in step 502, the IP address of the destination server, the port number of the destination server, and the protocol type between the client terminal and the destination server carried in the first data packet may be simultaneously extracted. Based on the IP address of the destination server, the port number of the destination server, and the protocol type, whether any index information matching the first data packet is present in the database is determined.

With respect to the existing technology, in the embodiment of the present disclosure, after the matched application program is determined based on the format feature of the first data packet, it is further determined whether the IP address of the destination server is present in the pre-configured database and whether the application programs corresponding to the IP address of the destination server include the matched application program. Thus, the efficiency of recognizing the network traffic is improved, and the rate of false recognition is reduced.

Figure 6:
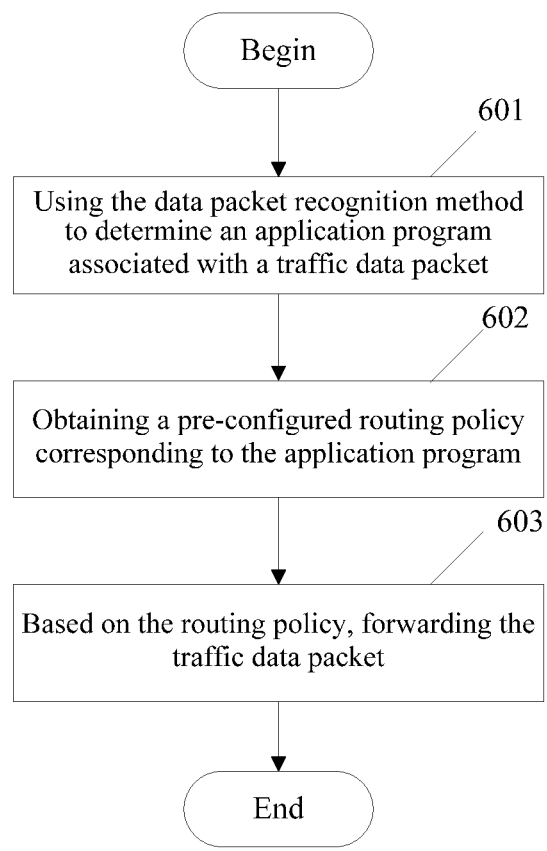
FIG. 6 illustrates a flow chart of another exemplary traffic redirection method according to disclosed embodiments.

Another embodiment of the present disclosure provides a traffic redirection method. The traffic direction method is based on the multi-packet recognition method in the previous embodiment. The flow chart of an exemplary embodiment is illustrated in FIG. 6.

Step 601: using the data packet recognition method to determine an application program associated with a traffic data packet.

After a connection between a client terminal and a destination server is established, based on the data packet recognition method provided by the previous embodiment, an application program associated with a first data packet is determined.

Step 602: obtaining a pre-configured routing policy corresponding to the application program.

After the application program associated with the first data packet is determined, the routing policy corresponding to the application program is obtained.

Step 603: based on the routing policy, forwarding the traffic data packet.

After the routing policy corresponding to the application program associated with the first data packet is obtained, a routing path is assigned based on the routing policy, and the first data packet is transmitted through the routing path. As previously described, after the routing policy corresponding to the application program associated with the first data packet is obtained, the routing path is assigned based on the routing policy, and the first data packet is transmitted through the routing path. Subsequently, other data packets transmitted through the connection (i.e., data packets after the first data packet) may be transmitted through the same routing path. That is, the routing path is assigned only once in the embodiment.

It is worth mentioning that in practical applications, when the first data packet is determined based on the data packet recognition method provided by the previous embodiment, a pre-configured routing path may be selected to forward the first data packet in either of the two cases below. The first case is after the application program matching the first data packet is found, and it is determined that the IP address of the destination server is absent in the pre-configured database (i.e., after step 505 is executed, but before step 507 is executed). The second case is after it is determined that the IP address of the destination server is present in the pre-configured database, but the application programs corresponding to the IP address of the destination server do not include the matched application program (i.e., after step 506 is executed, but before step 507 is executed). The pre-configured routing path has less desired transmission quality than the routing path corresponding to the application program matched by the routing policy. After the application program associated with the first data packet is finally determined through the data packet recognition method provided by the previous embodiment, index information matching the first data packet may be generated, and the mapping relationship between the generated index information and the finally determined application program is stored in the database. When the connection between the client terminal and the destination server is established again, the application program associated with the data packet may be found directly in the database, and the pre-configured routing policy corresponding to the application program may be used to forward the data packet.

The steps in various methods are divided for the clarity of illustration. In practical applications, multiple steps may be combined into one step, or one step may be separated into multiple steps. As long as the same logical relationship is preserved, modifications and changes are within the scope of the present disclosure. Insignificant modifications may be added or insignificant designs may be introduced in the algorithm or process. When the core design of the algorithm and process remains the same, such modifications and changes shall fall within the scope of the present disclosure.

It should be understood by those skilled in the art that the foregoing are merely certain preferred embodiments of the present disclosure, and are not intended to limit the present disclosure. Without departing from the spirit and principles of the present disclosure, any modifications, equivalent substitutions, and improvements, etc. shall fall within the scope of the present disclosure.

What is claimed is:

1. A multi-packet recognition method, comprising:
   obtaining a first data packet transmitted from a client terminal after a connection between the client terminal and a destination server is established, wherein the first data packet is a first data packet to carry first application layer data;
   determining whether a format feature in the first application layer data of the first data packet matches a data packet format feature of any known application program, wherein information parsed from specific bytes in the application layer data of the first data packet is the same as relevant feature in the application data of the matched application program, the specific bytes comprises the first and second bytes representing a length for a data parsing unit, the third and fourth bytes representing a fixed value for a version number, the fifth through eighth bytes representing an IP address of the server, the ninth and tenth bytes representing a command field, and when a matched application program is found, obtaining a second data packet, wherein the second data packet is a second data packet that is transmitted through the connection and carries second application layer data; and when the format feature in the application layer data of the second data packet matches the matched application program and the second data packet satisfies a pre-configured condition, recognizing the matched application program as the application program sending the first data packet.

2. The multi-packet recognition method of claim 1, wherein the determining of whether the second data packet satisfies a pre-configured condition includes:

determining whether specific bytes in the application layer data of the second data packet match the corresponding bytes in the application layer data of the first data packet, and a transmission direction of the second data packet matches a data transmission direction of the matched application program.

3. The multi-packet recognition method of claim 1, wherein:

the first data packet carries an IP address and a port number of the destination server; and before determining an application program matching the format feature of the first data packet, the multi-packet recognition method further includes:

based on the IP address and the port number of the destination server carried in the first data packet, determining whether index information matching the first data packet is present in a pre-configured database, wherein the index information includes an IP address and a port number of a server, and the database stores mapping relationships between the index information and the application programs;

when it is determined that the matched index information is present, recognizing the application program corresponding to the index information as the application program associated with the first data packet; and when it is determined that no matched index information is present, executing a step of determining an application program matching the format feature of the first data packet.

4. The multi-packet recognition method of claim 3, wherein:

the first data packet also carries a protocol type of the connection between the client terminal and the destination server;

the index information also includes a protocol type of the connection between the client terminal and the destination server; and determining whether the index information matching the first data packet is present in the pre-configured database includes:

based on the IP address and the port number of the destination server carried in the data packet and the protocol type carried in the first data packet, determining whether the index information matching the first data packet is present in the pre-configured database.

5. A data packet recognition method, comprising:

obtaining a first data packet transmitted from a client terminal after a connection between the client terminal and a destination server is established, wherein the first data packet is a first data packet to carry first application layer data;

based on an IP address and a port number of the destination server carried in the first data packet, determining whether index information matching the first data packet is present in a pre-configured database, wherein the index information includes an IP address and a port number of a server, and the database stores mapping relationships between the index information and the application programs;

when it is determined that the matched index information is present, recognizing the application program corresponding to the index information as the application program sending the first data packet;

when it is determined that no matched index information is present, determining an application program matching a format feature of the first data packet, wherein information parsed from specific bytes in the application layer data of the first data packet is the same as relevant feature in the application data of the matched application program, the specific bytes comprises the first and second bytes representing a length for a data parsing unit, the third and fourth bytes representing a fixed value for a version number, the fifth through eighth bytes representing an IP address of the server, the ninth and tenth bytes representing a command field;

when the matched application program is found, and the application programs corresponding to the IP address of the destination server include the matched application program, recognizing the matched application program as the application program sending the first data packet;

when the matched application program is found, but the IP address of the destination server is absent in the pre-configured database or the application programs corresponding to the IP address of the destination server do not include the matched application program, obtaining a second data packet, wherein the second data packet is a second data packet that is transmitted through the connection and carries second application layer data; and when the format feature of the second data packet matches the matched application program and the second data packet satisfies a pre-configured condition, recognizing the matched application program as the application program sending the first data packet.

6. The data packet recognition method of claim 5, wherein:

the first data packet also carries a protocol type of the connection between the client terminal and the destination server;

the index information also includes a protocol type of the connection between the client terminal and the destination server; and determining whether the index information matching the first data packet is present in the pre-configured database includes:

based on the IP address and the port number of the destination server carried in the data packet and the protocol type carried in the first data packet, determining whether the index information matching the first data packet is present in the pre-configured database.

7. The data packet recognition method of claim 5, wherein the determining of whether the second data packet satisfies a pre-configured condition includes:

determining whether specific bytes in the application layer data of the second data packet are the same as the corresponding bytes in the application layer data of the first data packet, and a transmission direction of the second data packet matches a data transmission direction of the matched application program.

8. A traffic redirection method, comprising:
obtaining a first data packet transmitted from a client terminal after a connection between the client terminal and a destination server is established, wherein the first data packet is a first data packet to carry first application layer data;
based on an IP address and a port number of the destination server carried in the first data packet, determining whether index information matching the first data packet is present in a pre-configured database, wherein the index information includes an IP address and a port number of a server, and the database stores mapping relationships between the index information and the application programs;
when it is determined that the matched index information is present, recognizing the application program corresponding to the index information as the application program sending the first data packet;
when it is determined that no matched index information is present, determining an application program matching a format feature of the first data packet, wherein information parsed from specific bytes in the application layer data of the first data packet is the same as relevant feature in the application data of the matched application program, the specific bytes comprises the first and second bytes representing a length for a data parsing unit, the third and fourth bytes representing a fixed value for a version number, the fifth through eighth bytes representing an IP address of the server, the ninth and tenth bytes representing a command field;
when the matched application program is found, and the application programs corresponding to the IP address of the destination server include the matched application program, recognizing the matched application program as the application program sending the first data packet;
when the matched application program is found, but the IP address of the destination server is absent in the pre-configured database or the application programs corresponding to the IP address of the destination server do not include the matched application program, obtaining a second data packet, wherein the second data packet is a second data packet that is transmitted through the connection and carries second application layer data; and
when the format feature of the second data packet matches the matched application program and the second data packet satisfies a pre-configured condition, recognizing the matched application program as the application program sending the first data packet;
obtaining a pre-configured routing policy corresponding to the application program; and
based on the routing policy, forwarding the first data packet.

9. The traffic redirection method of claim 8, wherein after the matched application program is found, but the IP address of the destination server is absent in the pre-configured database or the application programs corresponding to the IP address of the destination server do not include the matched application program, and before obtaining a second data packet, the method further includes:
selecting a pre-configured routing path to forward the first data packet, wherein the pre-configured routing path has less desired transmission quality than the routing path corresponding to the application program matched by the routing policy.

10. The multi-packet recognition method of claim 2, wherein the specific bytes in the application layer data of the second data packet comprises the command field.

11. The multi-packet recognition method of claim 3, wherein a timeout timer is configured for each mapping relationship between the index information and the application program in the database, when the timeout timer expires, the mapping relationship between the index information and the application program is deleted.

12. The multi-packet recognition method of claim 3, wherein after the obtaining a first data packet transmitted from a client terminal after a connection between the client terminal and a destination server is established, the method further includes:
determining whether the port number of the destination server is one of pre-configured common port numbers;
when it is determined that the port number is not any pre-configured common port number, based on the IP address and the port number of the destination server carried in the first data packet, determining whether index information matching the first data packet is present in the pre-configured database; and
when it is determined that the port number is one of the pre-configured common port numbers, determining whether the format feature in the first application layer data of the first data packet matches the data packet format feature of any known application program.

13. The data packet recognition method of claim 7, wherein the specific bytes in the application layer data of the second data packet comprises the command field.

14. The data packet recognition method of claim 5, wherein a timeout timer is configured for each mapping relationship between the index information and the application program in the database, when the timeout timer expires, the mapping relationship between the index information and the application program is deleted.

15. The multi-packet recognition method of claim 5, wherein after the obtaining a first data packet transmitted from a client terminal after a connection between the client terminal and a destination server is established, the method further includes:
determining whether the port number of the destination server is one of pre-configured common port numbers;
when it is determined that the port number is not any pre-configured common port number, based on the IP address and the port number of the destination server carried in the first data packet, determining whether index information matching the first data packet is present in the pre-configured database; and
when it is determined that the port number is one of the pre-configured common port numbers, determining whether the format feature in the first application layer data of the first data packet matches the data packet format feature of any known application program.

16. The multi-packet recognition method of claim 8, wherein a timeout timer is configured for each mapping relationship between the index information and the application program in the database, when the timeout timer expires, the mapping relationship between the index information and the application program is deleted.

17. The multi-packet recognition method of claim 8, wherein after the obtaining a first data packet transmitted from a client terminal after a connection between the client terminal and a destination server is established, the method further includes:
- determining whether the port number of the destination server is one of pre-configured common port numbers;
- when it is determined that the port number is not any pre-configured common port number, based on the IP address and the port number of the destination server carried in the first data packet, determining whether index information matching the first data packet is present in the pre-configured database; and
- when it is determined that the port number is one of the pre-configured common port numbers, determining whether the format feature in the first application layer data of the first data packet matches the data packet format feature of any known application program.

* * * * *